Figure 1:
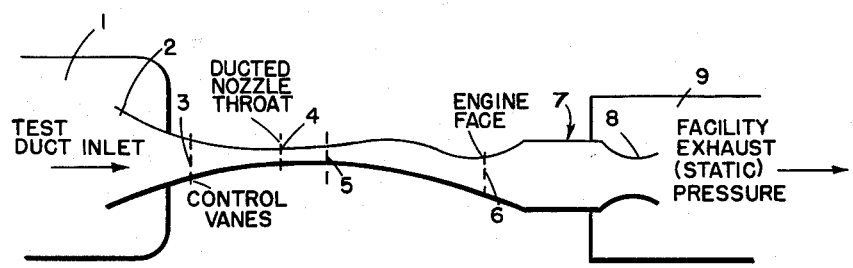

March 21, 1961 J. F. GANAHL 2,975,632
DUCTED NOZZLE TESTING APPARATUS
Filed June 4, 1957 4 Sheets-Sheet 1

INVENTOR.
JOSEPH F. GANAHL
BY Thomas S. MacDonald
ATTORNEY

March 21, 1961

J. F. GANAHL 2,975,632

DUCTED NOZZLE TESTING APPARATUS

Filed June 4, 1957

4 Sheets-Sheet 2

INVENTOR.
JOSEPH F. GANAHL

BY

Thomas S. MacDonald

ATTORNEY

March 21, 1961   J. F. GANAHL   2,975,632
DUCTED NOZZLE TESTING APPARATUS
Filed June 4, 1957   4 Sheets-Sheet 3

INVENTOR.
JOSEPH F. GANAHL
BY Thomas S. MacDonald
ATTORNEY

March 21, 1961   J. F. GANAHL   2,975,632
DUCTED NOZZLE TESTING APPARATUS
Filed June 4, 1957   4 Sheets-Sheet 4

INVENTOR.
JOSEPH F. GANAHL
BY Thomas S. MacDonald
ATTORNEY

United States Patent Office 2,975,632
Patented Mar. 21, 1961

2,975,632
DUCTED NOZZLE TESTING APPARATUS
Joseph F. Ganahl, Santa Ana, Calif., assignor to North American Aviation, Inc.
Filed June 4, 1957, Ser. No. 663,508
4 Claims. (Cl. 73—116)

The present invention is directed to apparatus for the simulation of flight parameters in the approach ducting and at the engine face of air breathing engines. More particularly the invention concerns simulating actual flight conditions during the testing of a jet engine adapted for eventual use at supersonic speeds.

Heretofore there have been no satisfactory ways to ground test an air breathing engine and its associated duct work. Air breathing engines, such as ramjets or turbojets, have been tested by use of a free jet but such testing is limited by lack of sufficient pressure ratio to start the facility and by lack of versatility in simulating actual flight conditions. Further, it is extremely difficult to test off-design flight conditions by such a method. This system of free jet testing cannot duplicate the disturbances attributable to the missile or airframe structure. Other unsatisfactory testing procedures employing the use of data obtained from small scale diffuser models have been used to predict characteristics of the inlet and coupled with direct engine tests on the ground have been used to predict the complete performances of the full scale flight propulsion system. The present method of ducted nozzle testing allows testing of a complete propulsion system by means of static sea level testing, altitude testing and wind tunnel testing prior to actual flight testing of the system on a complete missile or aircraft. Basically the present invention provides proper flow conditions for incoming air and the simulation of flight conditions by altering the flow conditions to produce predetermined pressure distributions and Mach number contours for the propulsion system under test. After air has been expanded to sonic velocity in the hereinafter described duct the air or other gas is further expanded supersonically to a predetermined Mach number and the local streamlines of the flowing air controlled to simulate conditions of flight which the engine will be subjected to during actual flight. The ducted nozzle in effect, duplicates the normal shocks which will occur in the airframe duct work and simulates the Mach number behind the oblique shock at the duct inlet.

An object of this invention is to provide apparatus for simulating various flight conditions at the engine face of an air breathing engine during ground testing.

A further object of this invention is to provide apparatus for controlling flight variables at an engine face and duplicate disturbances of a missile or aircraft body with which the engine is associated.

A still further object of this invention is to provide a new and novel apparatus for ground testing air breathing engines.

An additional object of this invention is to provide a ducted nozzle apparatus for testing air breathing engines.

Another object of this invention is to provide various apparatus used for the simulation of actual flight conditions in the duct work and at the engine face of a propulsion system undergoing ground testing.

Figure 2:
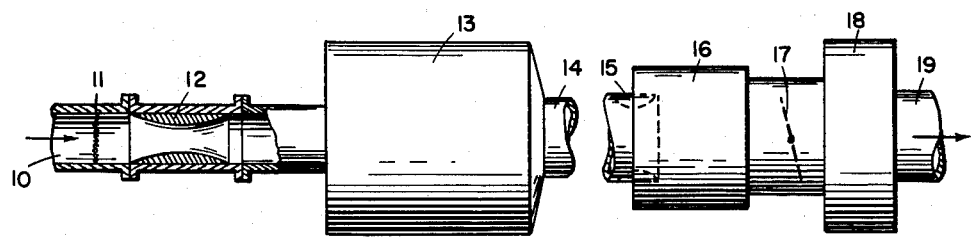
Figure 3:
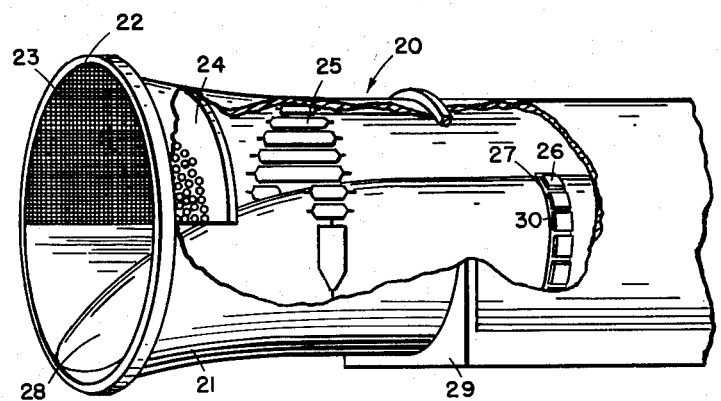
Figure 4:
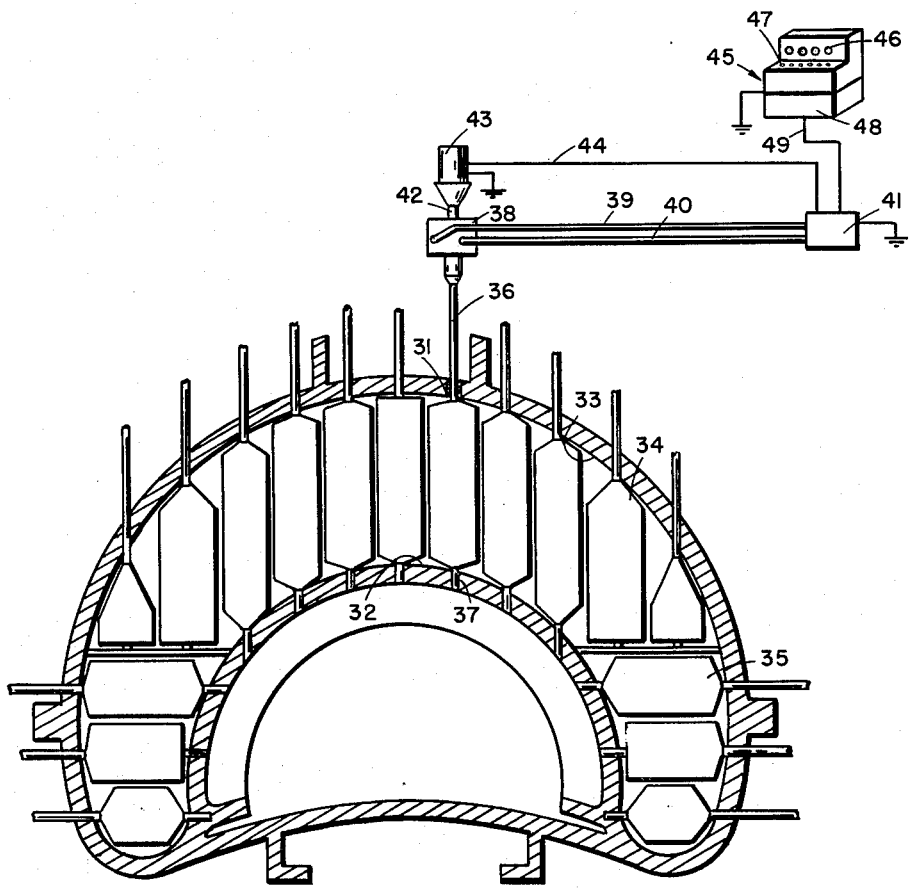
Figure 5:
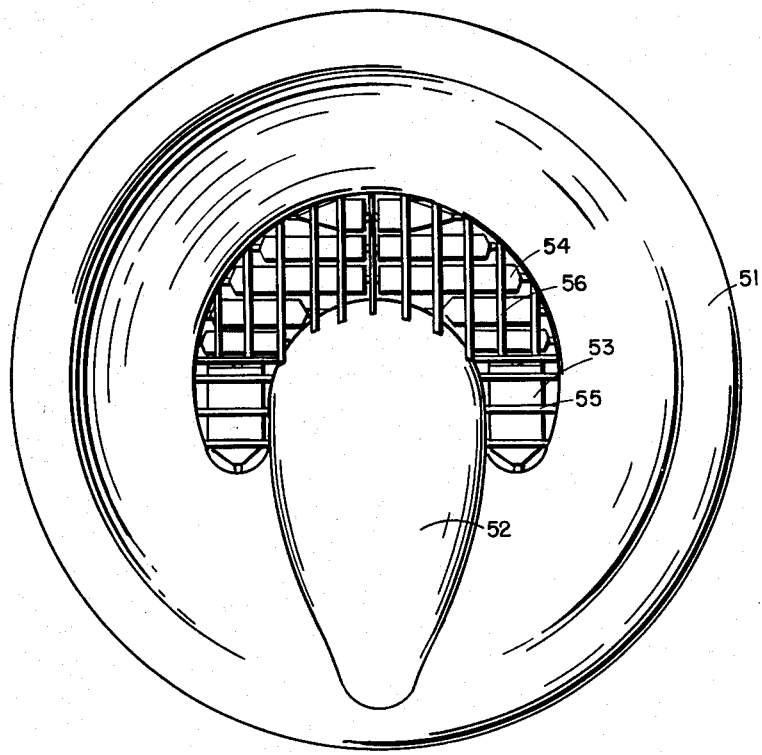
Figure 6:
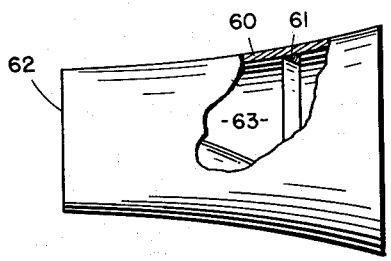
Figure 7:
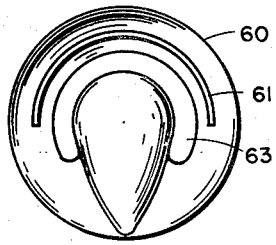
Figure 8:
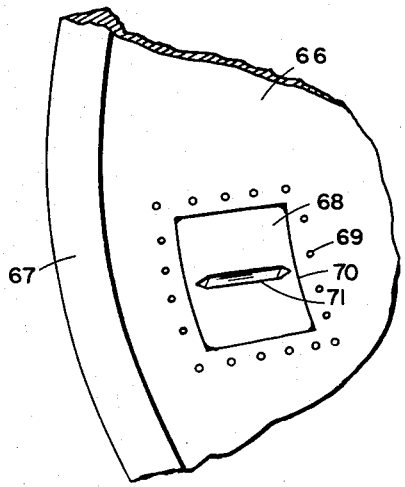
Figure 9:
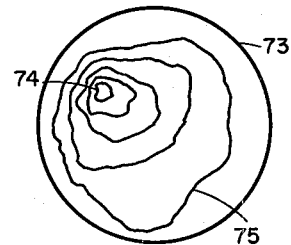
Figure 10:
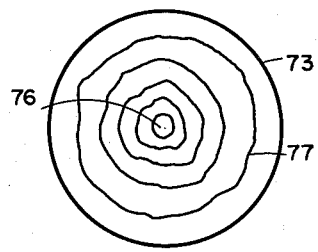
Figure 11:
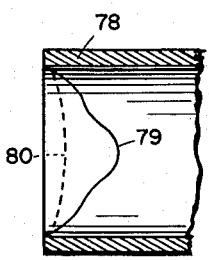

The above object as well as other objects of this invention will be apparent from the following description of the accompanying drawings in which Fig. 1 schematically shows a typical ducted nozzle;
Fig. 2 shows auxiliary equipment included in a ducted nozzle facility;
Fig. 3 shows a partial cutaway view of a typical ducted nozzle inlet;
Fig. 4 shows a particular form of flight simulation means along with a schematic of a program control system;
Fig. 5 is a front view of modified ducted nozzle inlet;
Fig. 6 shows a partial cross-sectional view of a section of a ducted nozzle throat section;
Fig. 7 shows a front view of the section seen in Fig. 6;
Fig. 8 shows an air flow simulation means on the inner periphery of a duct section;
Fig. 9 shows a typical Mach number contour at an engine face at off-design conditions;
Fig. 10 shows a Mach number contour at design conditions and;
Fig. 11 shows a cross-sectional view of desired and undesired pressure distributions at an engine face.

The ducted nozzle of the present invention is shown schematically in Figure 1. The installation includes a stilling chamber 1 of a size sufficient to give a smooth flow of air into the test duct inlet 2. In general the size of the chamber varies inversely with the distance from the inlet 2 to the control vanes 3 in order to provide smooth entrance flow. The control vanes 3 are situated in front of the ducted nozzle throat indicated at 4. The throat section is designed, as is known in the art, to obtain a Mach number of 1.0. The air or other gas flowing through the throat section is then expanded supersonically so that at station 5, a typical Mach number of 1.6 is obtained at this diffuser minimum section. In most applications this flow would then be reduced through a normal shock to subsonic flow at the actual engine face. The air at any of these velocities has its local streamlines controlled by movement of the control vanes 3 or by other means hereinafter described. The supersonic air flow, simulating actual flight conditions at on-design or off-design characteristics, flows to the engine face 6 of air breathing engine 7 with a pressure profile and Mach number contour simulating such characteristics. In the event that the ducted nozzle is contoured to provide a normal shock rearward of the supersonic zone and in front of the engine face, the flow velocity at the engine face will be subsonic. Propulsion gases from the engine 7 are passed rearwardly through the engine exhaust nozzle 8 into a flame chamber 9 and the remaining parts of the overall ducted nozzle facility.

Figure 2 shows such overall facility in which a conduit 10 conducts air from one or more conventional air compressors (not shown). A protective screen 11 is ordinarily provided in the conduit in front of a choked nozzle air flow meter 12 to provide uniform flow conditions to the flow meter. It is necessary, when artificially producing the desired engine inlet flow conditions by means of the hereinafter described flow control vanes, that the duct be calibrated before engine testing is begun. Vane positions or mechanisms for controlling the local streamlines, as hereinafter disclosed, must be adjusted to produce the desired flow conditions at the engine face. The convergent-divergent nozzle 12 in the air supply ducting maintains constant mass flow through the duct while the pressure losses through the vanes change during the calibrations. This is possible because the nozzle is sized to stay choked at all times. This nozzle 12 is removed after calibration of the ducted nozzle. Air from the ducting 10 is passed into the plenum or stilling chamber 13 and through the ducted nozzle 14, shown in detail in Figs. 1 and 3, is exhausted out the engine nozzle 15 into flame chamber 16. A valve 17 is provided in the exhaust ducting to control the back pressure on the engine and thereby simulate actual burning conditions in the engine. Various diffuser pressure recoveries can therefore be simulated by adjusting the back pressure. Thus the presently described ducted nozzle technique can simulate a range of high altitude flight conditions unlike any of the prior art devices. Maximum engine efficiencies with more realistic burning and combustion conditions are obtained with high pressure recoveries. A conventional vacuum apparatus 18 in duct work 19 leading to exhausters (not shown) complete the overall ducted nozzle facility. This apparatus 18 acts to simulate high altitude flights of the engine.

Figure 3 shows a partial cutaway view of a typical ducted nozzle inlet. The inlet shown is used in conjunction with a side inlet diffuser in which air flow is provided through a semi-annular space. The ducted nozzle flow control section 20 comprises a circular or other shaped duct 21 having means therein for varying the flow of air through the duct to control local streamlines and/or the normal shock location occurring in the duct. A screen 23 situated at the entrance 22 of the nozzle inlet is useable to induce flow disturbance factors. The effect of such a screen is greater with increasing Mach number and increasing velocity of the air stream at the inlet face. Preferably the flow disturbance screens are installed downstream of the inlet face for maximum disturbance. The screen 23 is preferably constructed of stainless steel wire mesh of varying wire diameters and mesh size. The screen 23, particularly when placed in a high velocity region downstream from the inlet face plane, may be rotatable or movable to multiple positions along the duct. Perforated blockage plates 24 may be substituted for or used in conjunction with screen 23. Various hole patterns and sector shapes may be employed to effect the desired control over the air flow. The preferred form of flow varying means are vanes 25 situated in the annulus in front of the nozzle throat section. These vanes and the controls thereof are described below. To further control engine face profiles, a series of movable flow disturbance generators may be provided to cause reflected shock waves in the duct similar to those occurring in flight and to provide a boundary layer disturbance similar to that on the full scale inlet in flight. These generators may take the form of curved plates 26 hydraulically actuated from within diffuser island 28 and capable of radial movement up and down out of a recess 27 of a depth sufficient to afford flush mounting of the generators if desired. The flow disturbance generators may be pivoted at a forward edge 30 and act as wedges to cause such reflected shock waves. As an alternative, as seen in Figs. 6 and 7, the wedges or flow disturbance generators may be on the inner periphery of the duct 21 on the side of the annulus opposite of the illustrated position of the generators 26. Suitable support means 29 on the exterior of the flow control section 20 is provided for ground installation of the overall duct.

Figure 4 shows in detail a preferred form of vane structure in conjunction with a program control system. Multiple vanes are situated in the semi-annulus formed between top surface 32 of the duct diffuser and the inner-peripheral surface 33 of the control section duct. A combination of vertical vanes 34 and horizontal vanes 35 have been found to give optimum control over the air flow to simulate actual flight conditions. Vanes 34 and 35 are fixed to rotatable shafts 36 which are journalled in bearings 31 extending through the duct wall and are supported on the diffuser in pivot bearings 37.

In describing the control system for the vanes, only the system for one vane is shown and is hereinafter described, but it should be understood that a separate hydraulic and electrical system is provided for each vane to be used in cooperation with the main electrical console 45.

A hydraulic actuator 38 which in this case is a sliding vane motor is connected by hydraulic tubing 39 and 40 to a hydraulic console 41. Together they provide the rotating force for shaft 36. A position transmitter 43 mounted on position shaft 42 is provided to indicate the position of the vane. One form of such transmitter is a precision potentiometer which will give a D.C. voltage output through wire 44 to hydraulic console 41 to indicate the position of the vane. The electrical console 45 has indicating dials 46 thereon to show the desired position of each vane, and vane setting knobs 47 to command the desired vane positions. In this modification the vane setting knobs 47 each have a precision potentiometer which gives a D.C. voltage output through wire 49 to hydraulic console 41 to indicate the desired vane position. Hydraulic console 41 has a reversible pump within it which forces hydraulic fluid through lines 39 and 40 to actuator 38 to position the vane 36. The direction of this pump is controlled by the output of the mixing of the D.C. voltage from the position indicator 43 and the potentiometer of vane setting knob 47. The pump will operate turning the vane until the D.C. voltages from lines 44 and 49 are equal. Thus the desired vane setting will be obtained.

It should be understood that the above described system is merely a way of providing a closed loop control means and means other than precision potentiometers could be provided to measure actual and desired vane positions and compare them for control purposes.

A programmer and automatic sequencer 48 typically taking the form of a magnetic tape or a punch card data processing system may also be employed to program into the electrical console 45 a given series of vane settings for specific time intervals. This makes it possible to test the propulsion system under various transient conditions accurately simulating actual flight conditions. By programming correct vane settings and tunnel operating conditions into the sequencer this engine test facility can subject an engine to the conditions it would actually encounter from engine start to landing with any flight maneuvers desired in between.

Figure 5 shows front view of ducted nozzle inlet 51 showing a duct diffuser 52 extending rearwardly towards the throat section in the semi-annular space between the top surface of the diffuser 52 and the inner-periphery surface of the duct and a first set of horizontally oriented vanes 55 and vertically oriented vanes 56. These vanes are in the same cross-sectional plane and are shown in the fully open position. Rearward of the first set of vanes are a second set of horizontal vanes 54 and vertical vanes 53 in a cross-sectional plane parallel to the first set of vanes. The juxtaposed vanes of each set are oppositely oriented so that air moving longitudinally in the duct must first pass a horizontal vane and then a vertical one or vice versa. Such dual vanes have been found to give optimum control over the simulation of flight conditions in the ducted nozzle. It has been determined that the vanes should be located in the subsonic flow in a range where the Mach number is equal to or greater than four tenths ($M=0.4$). Vanes extending radially within the annulus or circular duct opening may also be used.

Figure 6 shows a continual fixed wedge 61 located on the inner-periphery of the duct 60 at its upper side. Air flowing within the duct throat section 62 through the semi-annular duct 63 is disturbed by the wedge to cause a reflected shock wave in the duct and provide further boundary layer disturbance. Figure 7 is a front view of the wedge construction in which the wedge is seen in the form of a continuous semi-circular ring.

Figure 8 shows a further means for simulating and controlling engine face performance which is useable in conjunction with the heretofore described means. This means comprises a boundary layer bleed system for bleeding off any desired amount of boundary air. A slot or bleed orifice 71 is provided on a removable plate 68 fitted into a duct wall aperture 70. This removable plate 68 is held on the duct wall 66 by plate holding means 69. For ease in manufacturing and assembling the various flow simulating means, all of such means may be made up in discrete sections which can be put together to form the overall duct. A connecting flange 67 is provided on the duct wall so that this boundary layer section may be put in place in the overall extending duct. Suitable conduits (not shown) are provided from the orifice 71 to suck the boundary layer air into a chamber (not shown) which is exhausted to the vacuum chamber. Preferably the bleed system is placed rearward of the ducted nozzle throat section plane, in the area of supersonic flow.

Figure 9 shows a typical Mach number contour at an engine face under off-design conditions. The outer periphery 73 represents an engine face diameter while continuous contour lines 74 and 75 represent highest and lowest velocity flow areas, respectively. Figure 10 shows the Mach number contour at design conditions which can be simulated by the above described means within the ducted nozzle. Here continuous contour lines 76 and 77 represent the highest and lowest velocity flow area, respectively.

Figure 11 shows a cross-sectional view of desired and undesired pressure distributions at an engine face. The engine inlet is represented by cowling 78. Line 79 represents the off-design pressure profile while dotted line 80 shows a design pressure profile. It is desired that the heretofore described flow disturbance means within the ducted nozzle control the flow so as to conform it in ground testing to either on or various off-design conditions.

Various preliminary considerations are necessary in matching a specific flight condition to the engine being ground tested. It is first necessary that the capture area, pressure recovery to the engine face, and engine face Mach number be determined for the particular air frame configuration, as is generally known in the field. Thus the exact Mach number contour to be simulated by the present method and apparatus is defined. The average total pressure at the engine face is defined for a given altitude and the engine mass flow then fixed. Therefore, by holding the mass flow constant (by controlling the supply pressure from the compressor), the fuel-to-air ratio can be increased until the required average total pressure is established at the engine face under test. The flow varying means such as the vanes are adjusted to give the required Mach number contour at the engine face and along the approach ducting. The method of the present invention thus entails passing air under the aftersaid conditions of pressure and mass flow into a throated duct, expanding the air to sonic velocity at the throat section to give choked flow, further expanding the air supersonically to a predetermined Mach number and reducing the flow of subsonic if such flow is desired at the actual engine face. The local streamlines of the flowing air are controlled and such controlled air stream is flowed to the engine face. By this method any given design or off-design flight conditions can be duplicated. The ducted nozzle throat is sized such that continuity can be satisfied for the minimum engine face Mach number required. In other words, the ducted nozzle must be sized such that the normal shock can adjust itself between the nozzle throat and the engine face, and satisfy the required pressure at the engine face. Operation of the method can be accomplished by setting the supply pressure for a given altitude, with the correct engine mass flow, Mach number and pressure recovery established by adding sufficient fuel to obtain the total required pressure at the engine face. Concurrently the vanes will be adjusted to produce the correct Mach number distribution or contour along the duct and at the engine face. It can be seen that for a single profile usable in the acceptance testing of the series of air breathing engines that it would be sufficient to provide one set of fixed vanes for that one profile. The versatility of the present device for testing various engines and at various conditions can be seen due to the adjustable nature of the various flow distributing means. The ducted nozzle may also contain a variable throat design so as to control static pressure distribution to control shock positioning.

Although the invention has been described and illustrated in detail, it is clearly understood that the same is by way of illustration and example only and is not to be taken by way of limitation, the spirit and scope of this invention being limited only by the terms of the appended claims.

I claim:

1. A ducted nozzle for simulating actual flight conditions comprising an elongated duct, means to supply air to one end of said duct, throat means in said duct adapted to expand said air to sonic velocity, divergent means in said duct downstream of said throat means to expand said air to supersonic velocity and flow varying means extending into said duct between said one end and said throat means to simulate flow disturbances and to variably control the flow conditions of air including the pressure profile and Mach number contour exiting at the downstream end of said duct, the downstream end of said duct being connectible to the front face of a jet engine to supply controlled air flow to said engine face.

2. A ducted nozzle for simulating flight conditions at the face of an air breathing engine comprising an elongated duct adapted to extend forwardly from the face of the engine, means to supply air to said duct, a diffuser in said duct adapted to expand said air to sonic velocity, divergent means rearwardly of the minimum section of said diffuser to expand said air to supersonic velocity, said divergent means being connectible to said engine at said face, and flow varying means comprising a series of vanes extending across an annulus formed by said diffuser and the inner peripheral walls of said duct, positioned forwardly of said minimum nozzle section to control the local streamlines of the air flow at said engine face.

3. The invention as set out in claim 2 further comprising means to adjust the position of said vanes dependent on desired flight conditions.

4. The invention as set out in claim 2 in which said series of vanes include first and second spaced sets of vanes oriented horizontally and vertically in said elongated duct, juxtaposed vanes of each set being oppositely oriented.

References Cited in the file of this patent

UNITED STATES PATENTS

| | | |
|---|---|---|
| 2,357,625 | Armbruster | Sept. 5, 1944 |
| 2,592,322 | Nerad | Apr. 8, 1952 |
| 2,618,925 | Wislicenus | Nov. 25, 1952 |
| 2,684,690 | Lee | July 27, 1954 |
| 2,763,155 | Beams et al. | Sept. 18, 1956 |
| 2,791,240 | Storms et al. | May 7, 1957 |
| 2,805,571 | Graham | Sept. 10, 1957 |

FOREIGN PATENTS

| | | |
|---|---|---|
| 714,169 | Great Britain | Aug. 25, 1954 |

OTHER REFERENCES

Hermann, Rudolf: "Supersonic Inlet Diffusers and Introduction to Internal Aerodynamics," published by Minneapolis-Honeywell Regulator Company, 1956; page 11 is most pertinent.